United States Patent
Lee et al.

(10) Patent No.: US 11,480,229 B2
(45) Date of Patent: Oct. 25, 2022

(54) VIBRATION SUPPRESSION SYSTEM AND METHOD OF REDUCING VIBRATION ON FLEXIBLE BAR STRUCTURE IN VIBRATION SUPPRESSION SYSTEM

(71) Applicant: SEOUL NATIONAL UNIVERSITY R&DB FOUNDATION, Seoul (KR)

(72) Inventors: Dongjun Lee, Seoul (KR); Hyunsoo Yang, Bucheon-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 293 days.

(21) Appl. No.: 16/874,097

(22) Filed: May 14, 2020

(65) Prior Publication Data

US 2020/0362939 A1 Nov. 19, 2020

(30) Foreign Application Priority Data

| May 15, 2019 | (KR) | 10-2019-0057137 |
| Oct. 25, 2019 | (KR) | 10-2019-0134106 |
| Apr. 27, 2020 | (KR) | 10-2020-0051047 |

(51) Int. Cl.
| *B25J 9/16* | (2006.01) |
| *F16F 15/023* | (2006.01) |
| *B25J 5/00* | (2006.01) |
| *F16F 15/00* | (2006.01) |

(52) U.S. Cl.
CPC ............ *F16F 15/0235* (2013.01); *B25J 5/00* (2013.01); *B25J 9/1638* (2013.01); *F16F 15/002* (2013.01)

(58) Field of Classification Search
CPC ........ F16F 15/0235; F16F 15/002; B25J 5/00; B25J 9/1638
See application file for complete search history.

(56) References Cited

U.S. PATENT DOCUMENTS

| 10,052,773 | B2 * | 8/2018 | Arakawa | B25J 18/00 |
| 10,189,164 | B2 * | 1/2019 | Motoyoshi | B25J 13/088 |
| 10,471,593 | B2 * | 11/2019 | Tsuchiya | B25J 9/1694 |
| 10,611,031 | B2 * | 4/2020 | Itsukaichi | B25J 9/1638 |
| 11,254,007 | B2 * | 2/2022 | Yoshino | B25J 9/1694 |
| 2015/0209966 | A1 * | 7/2015 | Hasegawa | F16H 1/321 74/420 |
| 2017/0080577 | A1 * | 3/2017 | Motoyoshi | B25J 9/0018 |
| 2017/0087719 | A1 * | 3/2017 | Tsuchiya | B25J 9/1651 |

(Continued)

OTHER PUBLICATIONS

H. Yang, N. Staub, D. J. Lee and A. Franchi, "Modeling and control of multiple aerial-ground manipulator system (MAGMaS) with load flexibility," in proc. IEEE/RSJ Int'l conf. on intelligent robotics, pp. 4840-4847, 2018.

(Continued)

*Primary Examiner* — Thomas W Irvin
(74) *Attorney, Agent, or Firm* — Kilpatrick Townsend & Stockton LLP

(57) ABSTRACT

A vibration suppression system includes a ground manipulator, a flexible bar structure connected to an end of the ground manipulator, and at least one vibration suppression device configured to be distributedly arranged to be attached/detached to/from the flexible bar structure and configured to be controlled to reduce vibration and deflection occurring in the flexible bar structure by dispersing a load applied to the flexible bar structure due to movement or disturbance of the ground manipulator.

16 Claims, 12 Drawing Sheets

(56) References Cited

U.S. PATENT DOCUMENTS

2019/0009413 A1* 1/2019 Itsukaichi .............. B25J 9/1638
2019/0389077 A1* 12/2019 Hoshino ................. B25J 9/046
2021/0402591 A1* 12/2021 Klassen .............. B25J 19/0029

OTHER PUBLICATIONS

N. Staub, M. Mohammadi, D. Bicego, Q. Delamare, H. Yang, D. Prattichizzo, P. R. Giordano, D. J. Lee and A. Franch, "Tele-MAGMaS: an Aerial Ground Co-manipulator Systems," IEEE Robotics & Automation Magazine, 25(4), pp. 6-75, 2018.

Nicolas Staub et al., "The Tele-MAGMas, An Aerial-Ground Comanipulator System," IEEE Robotics & Automation Magazine, Oct. 26, 2018, 10 pages.

Notification of Reason for Refusal for Korean Application No. 10-2019-0134106 dated Mar. 12, 2021, 7 pages.

Staub et al., "The Tele-MAGMaS, An Aerial-Ground Comanipulator System," *IEEE Robotics & Automation Magazine*, Dec. 2018, 10 pages.

Notification of Reason for Refusal for KR Application No. 10-2020-0051047 dated Jun. 15, 2021, all pages.

* cited by examiner

VIBRATION SUPPRESSION SYSTEM AND METHOD OF REDUCING VIBRATION ON FLEXIBLE BAR STRUCTURE IN VIBRATION SUPPRESSION SYSTEM

CROSS-REFERENCE TO RELATED APPLICATIONS

This application claims the benefit of Korean Patent Application Nos. 10-2019-0057137, filed on May 15, 2019, 10-2019-0134106, filed on Oct. 25, 2019 and 10-2020-0051047, filed on Apr. 27, 2020 in the Korean Intellectual Property Office, the disclosures of which are incorporated herein in their entirety by reference.

BACKGROUND

1. Field

One or more embodiments relate to a system for reducing vibration on a flexible bar structure.

2. Description of Related Art

A large payload and a sufficient working space are required to utilize a robot in a construction site, a factory environment, etc., where a large object of various sizes needs to be transported and manipulated. To this end, the use of a multi-rotor type drone can be considered, but the use of a single drone is limited due to a small payload despite a large working space of the drone. On the other hand, since a ground manipulator can only work on the ground, there is a limitation in a narrow working space despite a relatively large payload. In addition, in the case of the ground manipulator, the use of torque is limited due to offset of the center of gravity of the operating object from end-effector of ground manipulator because the torque permissible range is relatively small compared to the payload.

PRIOR ART DOCUMENTS

Non-Patent Documents

[1] H. Yang, N. Staub, D. J. Lee and A. Franchi, "Modeling and control of multiple aerial-ground manipulator system (MAGMaS) with load flexibility," in proc. IEEE/RSJ Int'l conf. on intelligent robotics, pp. 4840-4847, 2018.

[2] N. Staub, M. Mohammadi, D. Bicego, Q. Delamare, H. Yang, D. Prattichizzo, P. R. Giordano, D. J. Lee and A. Franch, "Tele-MAGMaS: an Aerial Ground Co-manipulator Systems," IEEE Robotics & Automation Magazine, 25(4), pp. 6-75, 2018.

SUMMARY

One or more embodiments include a method and system for reducing vibration on a flexible bar structure connected to an end-effector of a ground manipulator or vibration due to disturbance applied to the flexible bar structure by utilizing cooperative control between the ground manipulator and at least one vibration suppression device.

Additional aspects will be set forth in part in the description which follows and, in part, will be apparent from the description, or may be learned by practice of the presented embodiments of the disclosure.

According to one or more embodiments, a vibration suppression system includes a ground manipulator, a flexible bar structure connected to an end-effector of the ground manipulator, and at least one vibration suppression device configured to be distributedly arranged to be attached/detached to/from the flexible bar structure and configured to be controlled to reduce vibration and deflection occurring in the flexible bar structure by dispersing a load applied to the flexible bar structure due to movement or disturbance of the ground manipulator, wherein the at least one vibration suppression device includes no actuators other than rotors.

Each of the at least one vibration suppression device may include a state estimation unit configured to estimate deflection of the flexible bar structure based on sensing data obtained through a sensor unit, a vibration suppression unit configured to reduce vibration and deflection of the flexible bar structure by using rotors, and a controller configured to generate a control signal to the input to the vibration suppression unit based on a deflection value of the flexible bar structure estimated by the state estimation unit, wherein the control signal includes data about a thrust value to be generated by using the rotors.

The at least one vibration suppression device that is detachably combined with the flexible bar structure and performs vibration suppression of the flexible bar structure by acting an external force on the flexible bar structure, may include a body part detachably combined with the flexible bar structure, a plurality of arm parts being upwardly inclined and extending from the body part in different directions, and rotors installed at a free end of each of the plurality of arm parts and having the form of a propeller installed to be rotatable with respect to the arm parts, wherein cylindrical trajectories that extend rotation trajectories of the rotors in a direction of a rotational axis of each of the rotors may be arranged so as not to interfere with each other.

Each of the at least one vibration suppression device may be controlled to reduce vibration and deflection occurring in the flexible bar structure based on thrust generated by using the rotors.

Vibration of the flexible bar structure may satisfy the Euler-Bernoulli equation, and the flexible bar structure may be expressed in finite vibration modes based on the Euler-Bernoulli equation, and a deflection degree of the flexible bar structure of the deflection value of the flexible bar structure estimated by the state estimation unit may be calculated by overlapping of vibration modes of the flexible bar structure, and a deflection angle of the flexible bar structure may be calculated by a value obtained by differentiating the deflection of the flexible bar structure in a longitudinal direction of a flexible bar.

In a case where a plurality of vibration suppression devices are attached to/detached from the flexible bar structure to be distributed in different positions of the flexible bar structure, at least one of the plurality of vibration suppression devices may be arranged to be attached to/detached from a position other than a node of the vibration modes of the flexible bar structure. The node of the vibration modes may refer to a position in which deflection becomes zero in the vibration modes.

Each of the at least one vibration suppression device may generate thrust in a vibration direction of the flexible bar structure.

The sum of an air resistance induced drag torque due to rotation of the rotors and a torque in a torsion direction due to thrust of the rotors may be physically perpendicular to a longitudinal direction of the flexible bar structure.

The vibration modes of the flexible bar structure may have different natural frequencies.

The ground manipulator may be fixed to the ground or may be mountable on a mobile platform and may control a manipulation direction of the flexible bar structure.

In a case where the at least one vibration suppression device is arranged on the flexible bar structure, a position of each of the at least one vibration suppression device arranged on the flexible bar structure may be determined according to a length of the flexible bar structure, a cross-section and material, and the number of the vibration suppression devices attached to the flexible bar structure.

Each of the at least one vibration suppression device may be arranged in a position in which a thrust value to be generated by using the rotors arranged in each of the vibration suppression devices so as to reduce vibration to a steady state in which vibration is attenuated, is minimized in a case where vibration occurs after an initial state of the flexible bar structure.

According to one or more embodiments, a method of reducing vibration of a flexible bar structure in a vibration suppression system, wherein the vibration suppression system includes a flexible bar structure connected to an end end-effector of a ground manipulator and at least one vibration suppression device, the method includes detecting vibration modes of the flexible bar structure, distributedly arranging the at least one vibration suppression device in a longitudinal direction of the flexible bar structure based on the detected vibration modes, and controlling the at least one vibration suppression device to reduce vibration and deflection occurring in the flexible bar structure by dispersing a load applied to the flexible bar structure due to movement or disturbance of the ground manipulator in the at least one vibration suppression device, wherein the at least one vibration suppression device includes no actuators other than rotors.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
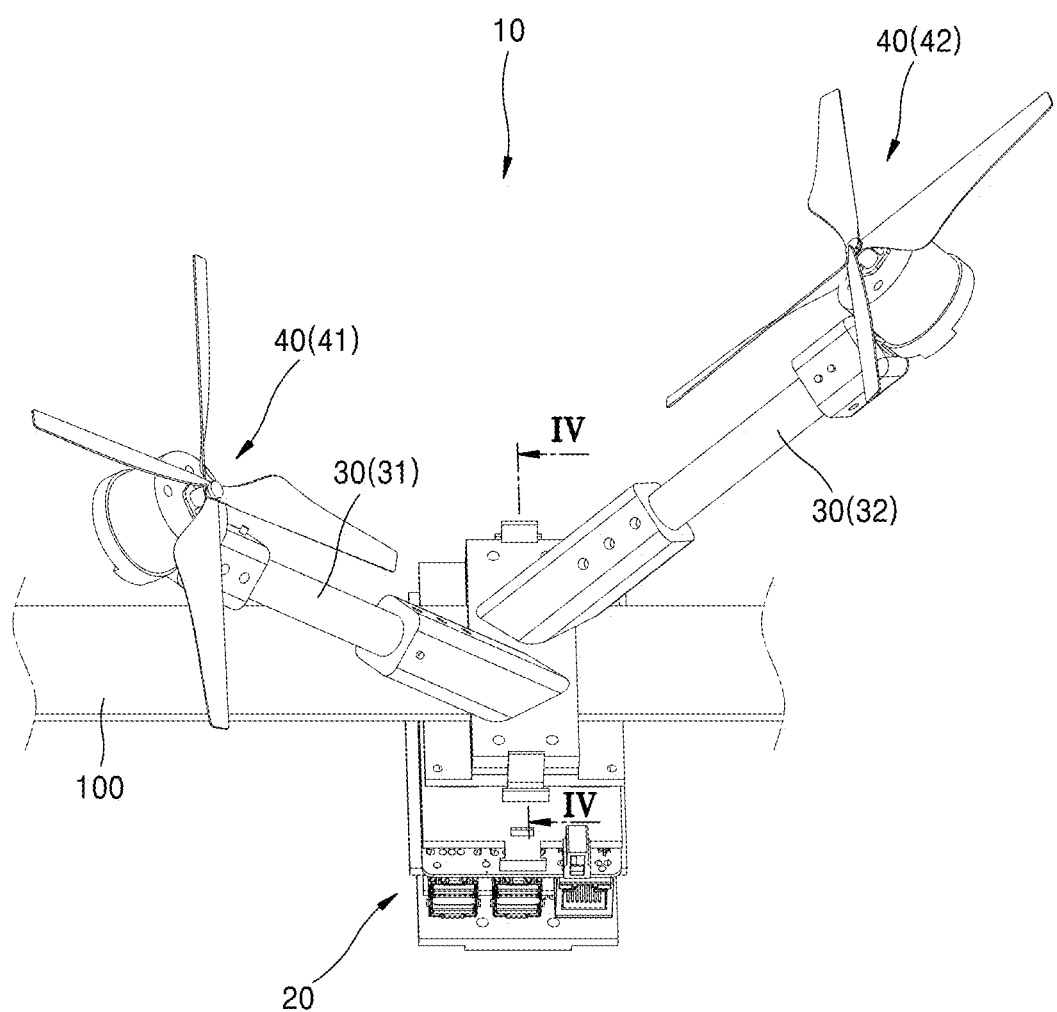
FIG. 1 is a perspective view of a vibration suppression device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in more detail with reference to the accompanying drawings.

Figure 2:
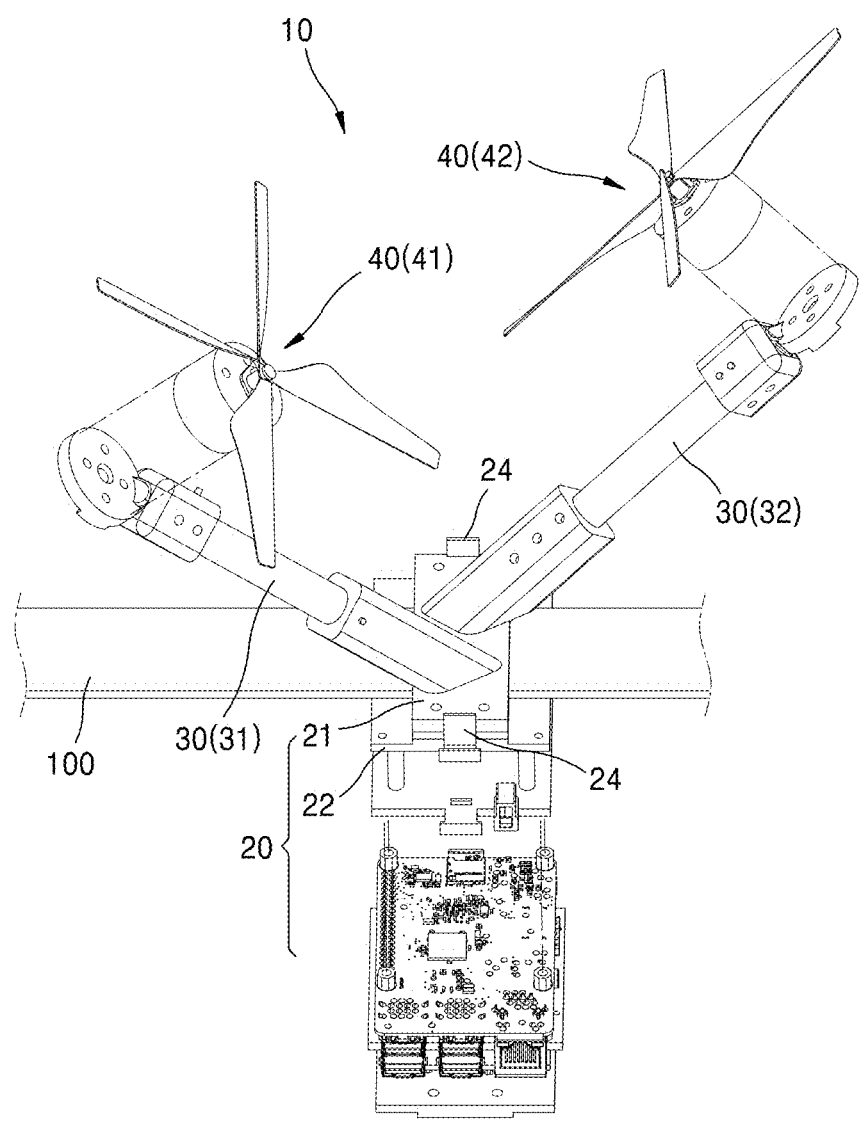
FIG. 2 is an exploded perspective view of a main part of the vibration suppression device shown in FIG. 1.
Figure 3:
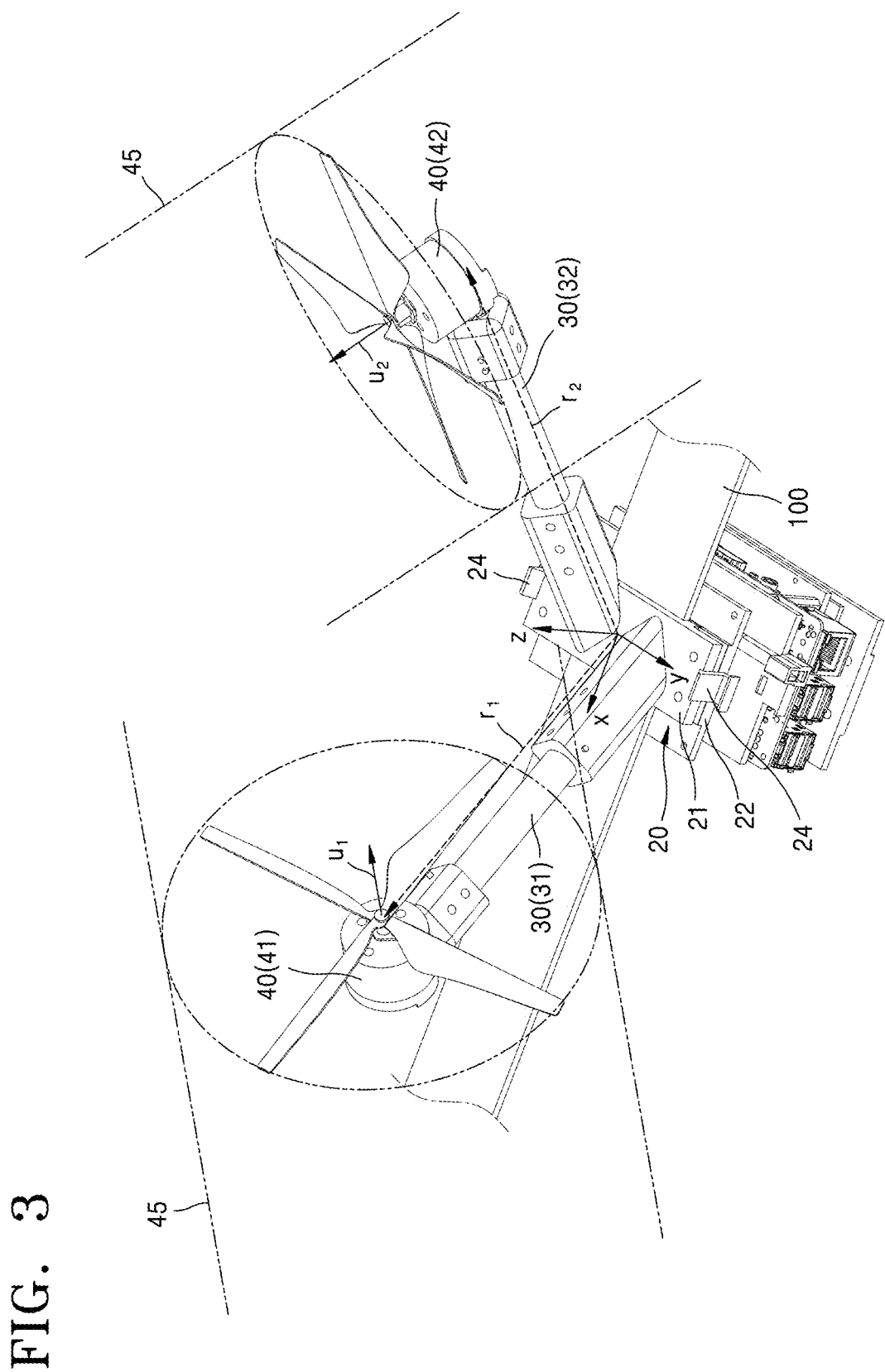
FIG. 3 is a view for describing a geometric arrangement structure of an arm part and a rotor shaft of the vibration suppression device shown in FIG. 1.
Figure 4:
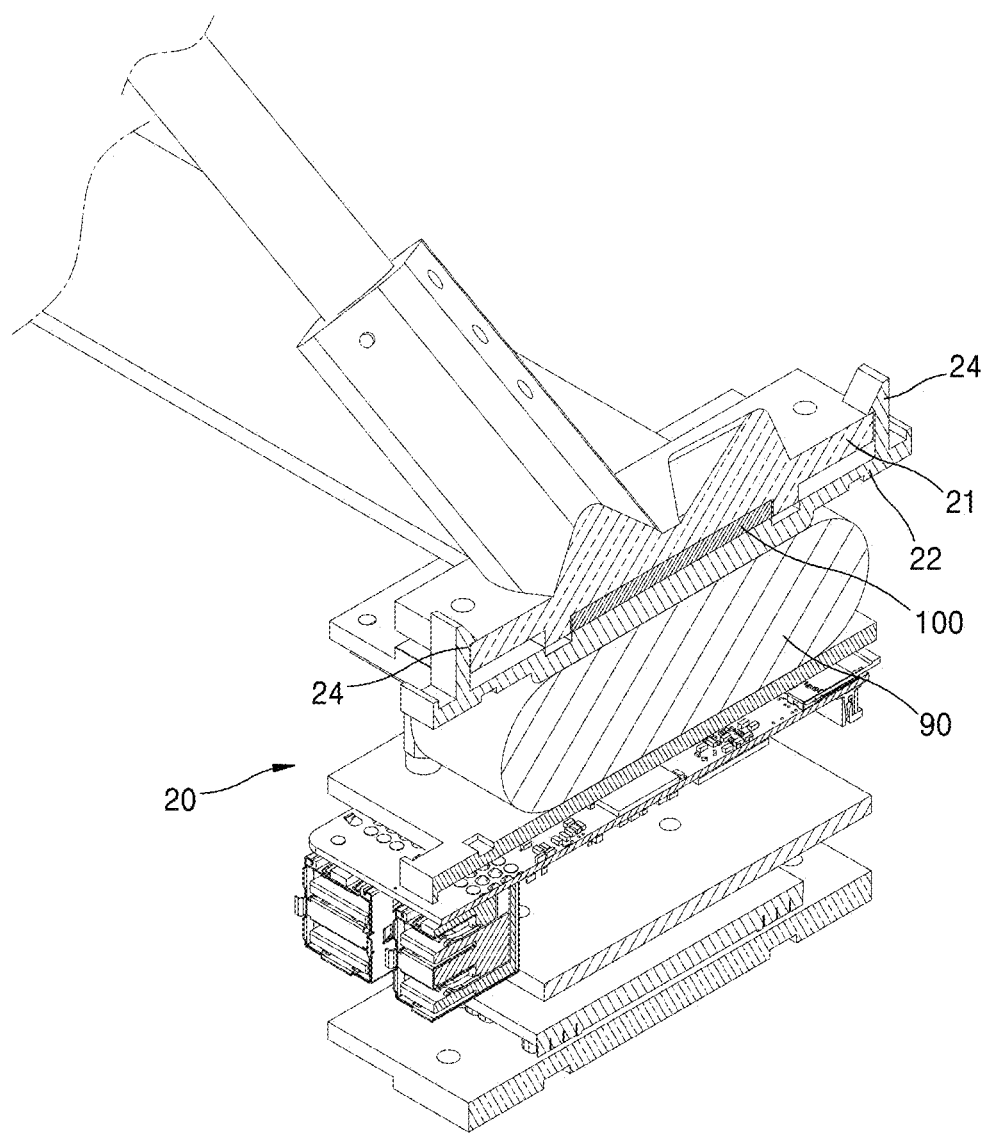
FIG. 4 is a cross-sectional view of the vibration suppression device taken along a line IV-IV of FIG. 1.
Figure 5:
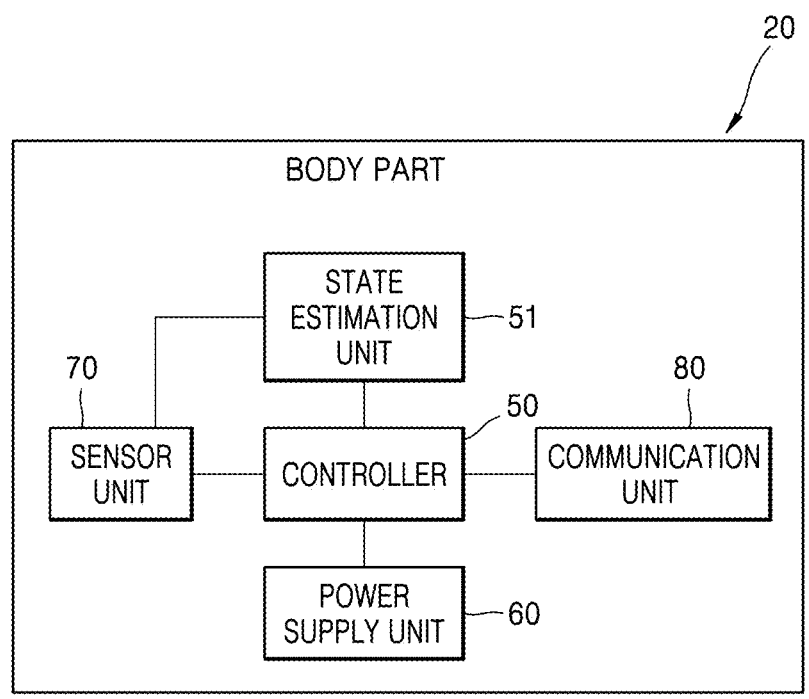
FIG. 5 is a configuration diagram of a body part that constitutes the vibration suppression device shown in FIG. 1.
Figure 6:
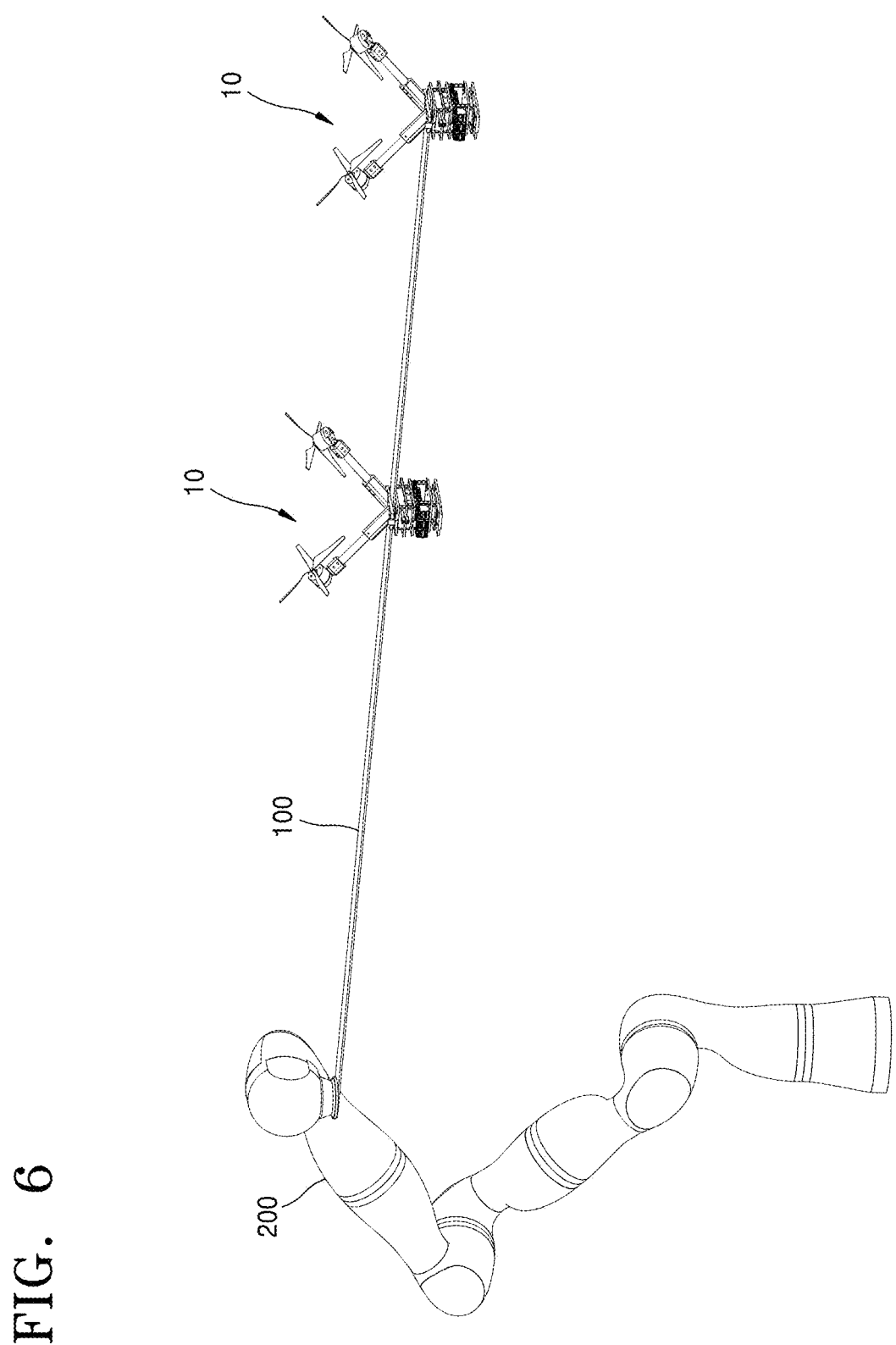
FIG. 6 is a view schematically showing the configuration of a vibration suppression system in which the vibration suppression device and a manipulator shown in FIG. 1 cooperate.
Figure 7:
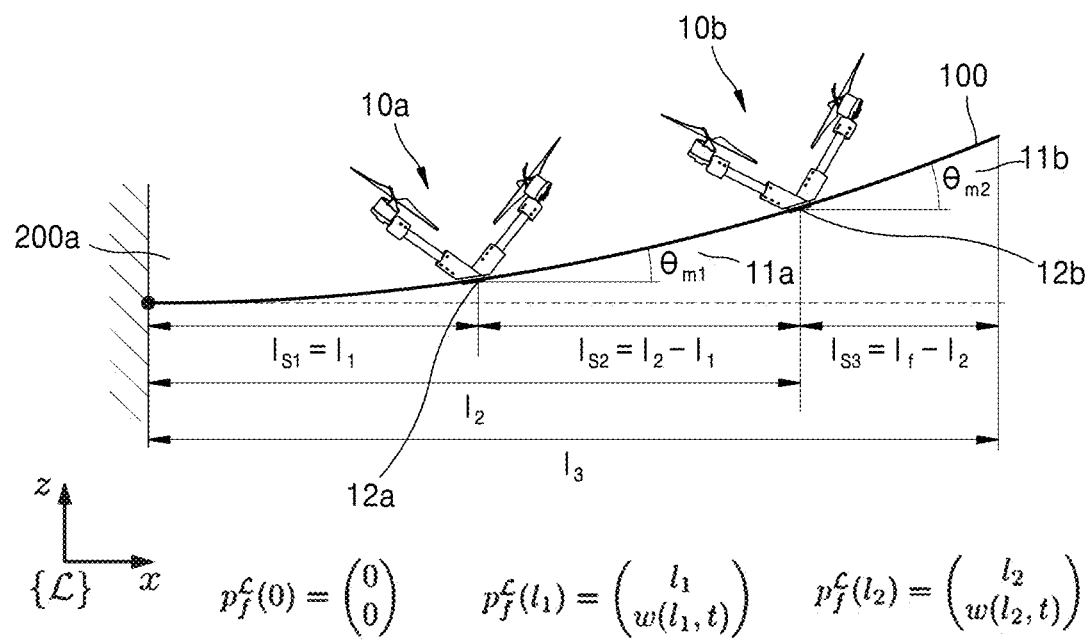
FIG. 7 is a view showing an example of a deflection angle according to vibration of a flexible bar structure used in the vibration suppression system of FIG. 6, according to an embodiment.

FIG. 1 is a perspective view of a portable vibration suppression device according to an embodiment. FIG. 2 is a partial perspective view of a main part of the vibration suppression device shown in FIG. 1. FIG. 3 is a view for describing a geometric arrangement structure of an arm part and a rotor shaft of the vibration suppression device shown in FIG. 1. FIG. 4 is a cross-sectional view of the vibration suppression device taken along a line IV-IV of FIG. 1. FIG. 5 is a configuration diagram of a body part that constitutes the vibration suppression device shown in FIG. 1. FIG. 6 is a view schematically showing the configuration of a vibration suppression system in which the vibration suppression device and a manipulator shown in FIG. 1 cooperate. FIG. 7 is a view showing an example of a deflection angle (→deflection angle) according to vibration of a flexible bar structure used in the vibration suppression system of FIG. 6, according to an embodiment.

Referring to FIGS. 1 through 7, a portable vibration suppression device 10, 10a, or 10b (hereinafter referred to as a "vibration suppression device") according to an embodiment may be detachably installed on a flexible bar structure 100.

The flexible bar structure 100 that is a structure having the form of a bar having a sufficiently large width compared to a thickness and extending long, is defined as a structure in which vibration in a width direction is negligible. Examples of the flexible bar structure 100 may include aluminum, wood, etc.

A longitudinal section of the flexible bar structure 100 is assumed to have a rectangular shape in which the horizontal length is sufficiently larger than the vertical length. Also, the flexible bar structure 100 may be regarded as having little vibration in a longitudinal direction. Thus, it can be assumed that vibration of the flexible bar structure 100 mostly occurs in a thickness direction alone.

In an embodiment, vibration of the flexible bar structure 100 satisfies the Euler-Bernoulli equation of Equation 1 and varies with time and position along the flexible bar structure 100.

$$\rho A \frac{\partial^2 w(x,t)}{\partial t^2} + \frac{\partial^2}{\partial x^2} EI \frac{\partial^2 w(x,t)}{\partial x^2} = 0 \quad \text{[Equation 1]}$$

In Equation 1, w(x,t) represents a function representing deflection in the y-axis direction depending on the position x and time t in the flexible bar structure 100. ρ, A, E, and I represent the density of the flexible bar structure 100, the second moment of area, Young's modulus, and properties of an object manipulated in a cross section, respectively.

In Equation 1, w(x,t) which represents the deflection of the flexible bar structure 100 satisfies the Euler-Bernoulli equation, and may be expressed again in Equation 2.

$$w(x,t) = \sum_{i=1}^{m} \phi_i(x)\delta_i(t) =: \Phi(x)\delta(t) \quad \text{[Equation 2]}$$

The solution of the Euler-Bernoulli equation may be obtained using a separation of variable method, and is expressed by the sum of the products of a time-dependent variable δ(t) and a position-dependent variable $\phi_i(t)$ representing the shape of each vibration mode. In this case, m represents the number of vibration modes representing vibration of the flexible bar structure 100, and in theory, there may be infinite vibration modes, but the high-order vibration mode is rapidly attenuated and disappears from vibration of an actual flexible body and thus may be expressed in the finite vibration modes described above. In this case, m may be changed depending on the property and shape of the flexible bar structure 100. The vibration modes of the flexible bar structure 100 is characterized by having different natural frequencies.

The shape $\phi_i(x)$ of each vibration mode may be expressed as Equation 3.

$$\phi_i(x) = C_{1,i} \cos h\beta_i x + C_{2,i} \cos \beta_i x + C_{3,i} \sin h\beta_i x + C_{4,i} \sin \beta_i x \quad \text{[Equation 3]}$$

$C_{1,i}$ represents a vibration shape function of an i-th vibration mode and an i-th coefficient of $\phi_i(x)$. In order to satisfy the Euler-Bernoulli equation, $\beta_i^4 := w_{n,i}^2 \rho A/EI$ is satisfied, and $w_{n,i}$ represents an Eigen natural frequency of the i-th vibration mode. Because Equation 2 represents the shape of each vibration mode, a corresponding deflection value $\phi_i(x)$ at the longitudinal position x of the flexible body is determined by Equation 3, and a value $\phi_i(x)\delta_i(t)$ multiplied with the variable δ(t) that changes over time represents deflection at the given position x in the given time t of the i-th vibration mode.

Thus, deflection by each vibration mode is expressed in a shape in which the shape of the vibration mode determined by $\phi_i(x)$ is increased and decreased with the change of $\delta_i(t)$ over time. Therefrom, because the actual deflection of the flexible bar structure 100 is a superposition of each vibration mode, it may be expressed as their sum w(x,t).

In addition, referring to FIG. 7, each point of the flexible bar structure 100 may be expressed as Equation 4 with respect to a flexible bar fixed coordinate system by a deflection equation according to the vibration of the flexible bar structure 100.

$$p_j^L(x,t) = \begin{bmatrix} x \\ w(x,t) \end{bmatrix}, \theta_j(x,t) = \frac{\partial w(x,t)}{\partial x} \quad \text{[Equation 4]}$$

A point in which the flexible bar structure 100 is connected to the ground manipulator, may be represented by $$p_j^L(0) = \begin{pmatrix} 0 \\ 0 \end{pmatrix}, \quad (20\text{0a})$$

and the position of a first vibration suppression device 10a may be represented by $$p_j^L(l_1) = \begin{pmatrix} l_1 \\ w(l_1,t) \end{pmatrix}, \quad (12\text{a})$$

and the position of a second vibration suppression device 10b may be represented by $$p_j^L(l_2) = \begin{pmatrix} l_2 \\ w(l_2,t) \end{pmatrix}. \quad (12\text{b})$$

In addition, the deflection angle of the flexible bar structure 100 in which the first vibration suppression device 10a is arranged, may be represented by $\theta_{m1}(11a)$, and the deflection angle of the flexible bar structure 100 in which the second vibration suppression device 10b is arranged, may be represented by $\eta_{m2}(11b)$.

In an embodiment, the vibration of the flexible bar structure 100 is represented by finite vibration modes, and the deflection of the flexible bar structure 100 is calculated by superposition of the vibration modes of the flexible bar structure 100 In addition, the deflection angle of the flexible bar structure 100 may be represented by a value obtained by differentiating the deflection of the flexible bar structure 100 in the longitudinal direction of the flexible bar.

The vibration suppression devices 10, 10a, and 10b in FIGS. 1 through 7 may be detachably combined with the flexible bar structure 100 and may act an external force on the flexible bar structure 100, thereby reducing vibration of the flexible bar structure 100. More specifically, the vibration suppression device 10 may perform an operation of reducing vibration of the flexible bar structure 100 by applying a thrust force to the flexible bar structure 100 and acting an external force at a specific position.

Figure 8:
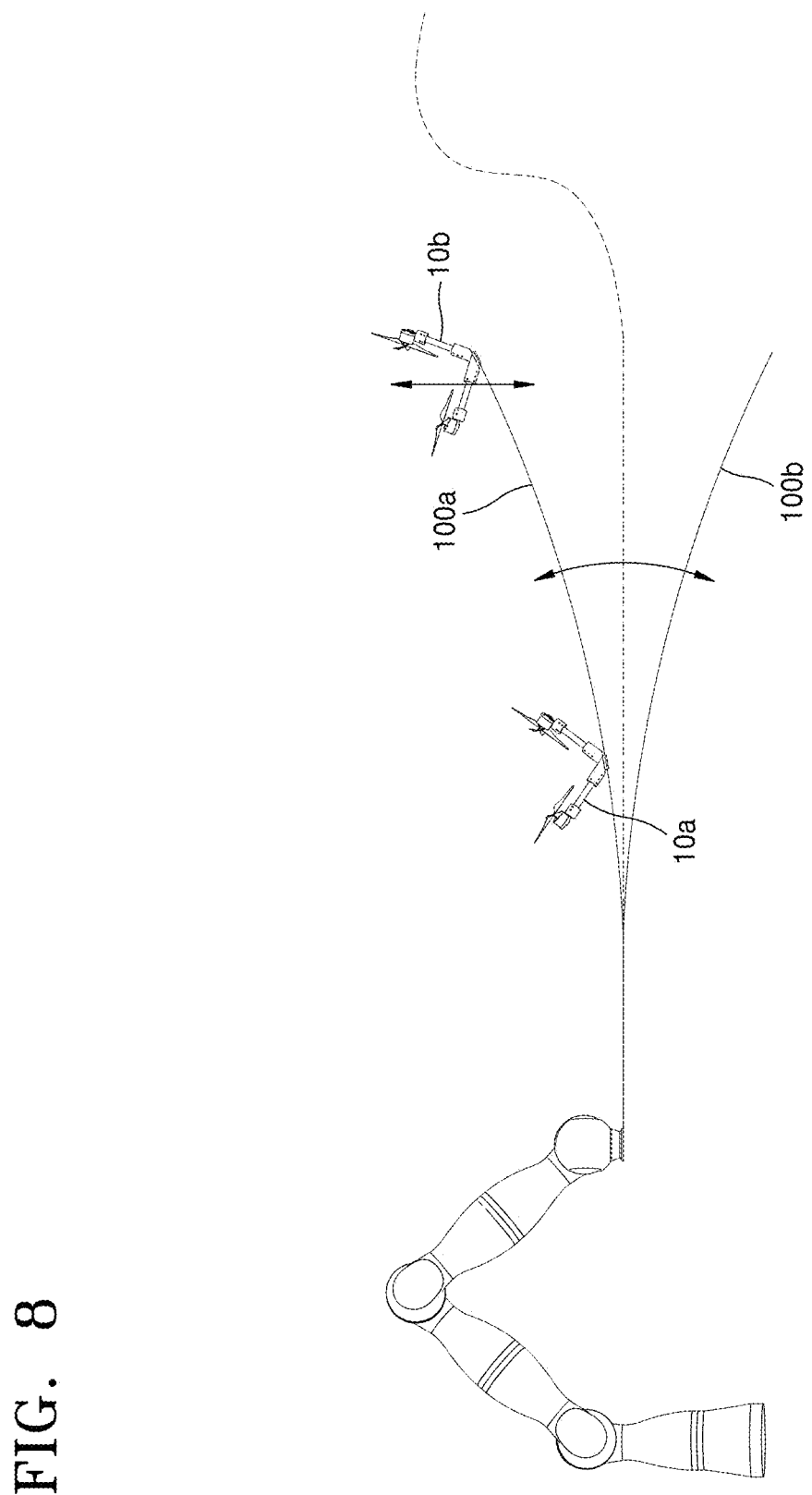
FIG. 8 is a view showing an example in which vibration occurs in the flexible bar structure constituting the vibration suppression system, according to an embodiment.

Further referring to FIG. 8, the flexible bar structure 100 may be connected to a ground manipulator 200 so that vibration or deflection may occur due to the movement or external force of the ground manipulator 200 (100a and 100b). Vibration suppression devices may be arranged on the flexible bar structure 100 and may be implemented to reduce vibration or deflection occurring in the flexible bar structure 100. According to an embodiment, a plurality of vibration suppression devices 10a and 10b may be distributedly arranged on the flexible bar structure 100. The plurality of vibration suppression devices 10a and 10b may be controlled to rapidly reduce vibration or deflection by dispersing the load applied to the flexible bar structure 100.

The vibration suppression devices may be arranged in a position in which the thrust force required to reduce vibration to a steady state when used for the purpose of vibration suppression, such as in the case of measuring deflection of a flexible body using an external measuring device, is minimized.

The vibration suppression devices may also be arranged in a position in which deflection measurement of the flexible bar structure is maximized when a deflection measurement function of the flexible body is performed, such as when vibration is not reduced by thrust. In an embodiment, when an inertial measurement unit (IMU) is attached, the vibration suppression devices may be arranged at a point in which a value obtained by differentiating the deflection of the flexible bar structure in the longitudinal direction becomes the maximum. In another embodiment, when a stretch sensor and a stretch gauge are attached, the vibration suppression devices may be arranged at a point in which a value obtained by differentiating deflection in the longitudinal direction twice becomes the maximum. In another embodiment, the vibration suppression devices may be arranged in a position in which both thrust value minimization and strain detection accuracy maximization are satisfied.

The vibration suppression device 10 may include at least two rotors 40 so as to provide a control input for performing vibration or deflection suppression on a plane where the flexible bar structure 100 vibrates. The rotor 40 needs an optimal layout design to generate maximum thrust on a plane along a workspace. In addition, the optimally-arranged rotor 40 may generate the combined force of each rotor thrust in a desired direction. Also, uncontrollable torque using the plurality of rotors 40 is required to be minimized, and aerodynamic interference between the plurality of rotors 40 is required to be minimized.

In an embodiment, the vibration suppression device 10 may include a body part 20, an arm part 30, and the rotor 40.

The body part 20 may be detachably combined with the flexible bar structure 100. The body part 20 may be configured to be easily mounted and detached, for example, by a hook means on the flexible bar structure 100.

A top surface of the body part 20 may include a planar portion (not shown) parallel to the flexible bar structure 100. More specifically, the body part 20 may be formed by combining a plurality of components.

The body part 20 may include an upper body 21 and a lower body 22. The upper body 21 may be a part with which the arm part 30 to be described later is combined. The lower body 22 may be configured to support a lower portion of the flexible bar structure 100. A snap hook 24 may be provided in the lower body 22.

The snap hook 24 may perform a function of easily combining and detaching the lower body 22 and the upper body 21. The flexible bar structure 100 may be fixed in the form of a sandwich between the upper body 21 and the lower body 22.

A battery 90 may be installed at the lower body 22. The battery 90 may be fixed at the lower body 22 by using a battery support plate. The battery support plate may be fixed on the lower body 22 by using a fixing means, such as a bolt or screw.

A plurality of arm parts 30 may be provided. For example, two arm parts 30 may be provided. The arm parts 30 may be arranged to be upwardly inclined and to extend from the top surface of the body part 20. A bottom end of the arm part 30 may be fixed to the body part 20. The arm part 30 may be arranged to be inclined in a direction away from an imaginary line perpendicular to the planar portion of the body part 20 at a point in which the bottom end of the arm part 30 and the body part 20 meet upward. Each arm part 30 may be arranged in different directions.

The rotor 40 may be installed at a free end of each arm part 30. The rotor 40 may include a propeller-shaped structure driven by a motor. The propeller-shaped structure may be installed to be rotatable with respect to the arm part 30. The motor may be driven by a signal input by a controller 50 that will be described later. The rotor 40 may include a rotation shaft.

The thrust generated by rotation of a plurality of rotors 40 may be arranged so as not to interfere with each other aerodynamically. More specifically, cylindrical trajectories 45 that extend rotation trajectories of each of the rotors 40 in the direction of a rotational axis of each of the rotors 40 may be arranged so as not to interfere with each other.

Such a condition is premised on that the thrust of the propellers constituting each rotor 40 occurs in the direction of the rotational axis of the rotor 40, and the space exerted by the thrust by the propeller does not deviate from the cylindrical rotational trajectory of the propeller.

In the present embodiment, two rotors 40 may have rotational axes in different directions. When the cylindrical trajectory 45 formed by extending the rotational trajectory of each rotor 40 in the direction of the rotational axis of each rotor 40 does not interfere with each other, it may be considered that there is no interference due to the air flow of thrust by each rotor 40.

In FIG. 3, the reference coordinate axis in a three-dimensional space defines the longitudinal direction of the flexible bar structure 100 as the x-axis at the center of a position in which the vibration suppression device 10 and the flexible bar structure 100 are combined with each other. In addition, the width direction of the flexible bar structure 100 is defined as the y-axis. The thickness direction of the flexible bar structure 100 is defined as the z-axis.

In addition, the unit vector of the thrust direction of the rotors 40 is defined as $u_1, u_2, \ldots,$ and $u_i$. Position vector of the arm part 30 is defined as $r_1, r_2, \ldots, r_i$. In addition, each axial unit vector of x, y, and z is defined as $e_x$, $e_y$, and $e_z$.

When the two arm parts 30 and the rotors 40 are provided in the three-dimensional space defined as described above and the condition without interference between the air flows of the thrust caused by each rotor 40 is expressed by an equation, $$\frac{|(r_1 - r_2) \cdot (u_1 \times u_2)|}{|u_1 \times u_2|} \geq d_{aero} \quad \text{[Equation 5]}$$

Equation 5 is interpreted to mean that a difference $(r_1-r_2)$ between the position vectors of each arm part 30 and an inner product value of the unit external vector $(u_1 \times u_2)$ of the two rotors 40 need to be greater than or equal to a certain value.

More specifically, referring to FIG. 3, a first rotor 41 generates thrust in a direction of $u_1$ from a position $r_1$. A second rotor 42 generates thrust in a direction of $u_2$ from a position $r_2$. Equation 2 is a condition that the shortest distance between the axis extending from the position $r_1$ in the direction w and the axis extending from the position $r_2$ in the direction $u_2$ is equal to or greater than a certain value.

Because each of the thrust of the first rotor 41 and the thrust of the second rotor 42 may be generally considered that the rotational trajectories of the propellers of the first rotor 41 and the second rotor 42 extend in the directions $u_1$ and $u_2$, respectively, when the rotors 40 are arranged so that the cylindrical trajectory 45 does not interfere with each other, aerodynamic interference due to thrust between the plurality of rotors 40 does not occur.

In Equation 5, $d_{aero}$ may be interpreted that there is no aerodynamic interference due to thrust of each rotor 40 in the process of rotation of the two rotors 40 when a distance between the axes extending in the thrust direction of each of the rotors 40 has a value equal to or greater than the diameter of the rotational trajectory of each of the rotors 40.

In addition, the sum of the air resistance torque due to rotation of the rotors 40 installed at the free end of each arm part 30 and the torque in the twisting direction due to thrust of the rotors 40 may be configured to be physically perpendicular to the longitudinal direction of the flexible bar structure 100.

Referring to FIG. 3, the air resistance torque due to rotation of the rotors 40 at each arm part 30 may be represented as $\gamma u_i$. Here, $\gamma$ that is an air resistance coefficient of the rotors 40 has a specific constant value. In addition, the torsional resistance torque (→torsional torque) of the arm part 30 due to rotation (→thrust) of the propeller of each rotor 40 may be represented as $r_i \times u_i$. When the projected value (inner product) in the x-axis direction of the sum of the torque of the arm part 30 according to the thrust of the rotors 40 installed at the free end of each arm part 30 and the air resistance torque due to rotation of the rotors 40 becomes zero. The sum vector of the torsional torque of the arm part 30 due to the thrust of the rotors 40 and the air resistance torque due to rotation of the rotors 40 is perpendicular to the x-axis, cos 90°=0. Thus, the conditional equation may be defined as in Equation 6.

$$(r_i \times u_i \times \gamma u_i \cdot e_x = 0 \qquad \text{[Equation 6]}$$

Equation 6 represents that each arm part 30 and each rotor 40 may be arranged so that the sum of the torsional torque of the arm part 30 due to the thrust of each rotor 40 installed in each arm part 30 and the torque vector according to air resistance due to rotation of each rotor 40 is perpendicular to the x-axis.

In the device satisfying the conditions of Equation 6, it has a physical meaning that there is no external force acting in the x-axis direction when each rotor 40 installed in each arm part 30 rotates. Thus, an external torque does not act in the longitudinal direction of the flexible bar structure 100 so that vibration control of the flexible bar structure 100 may be more precisely performed.

Each rotor 40 installed at the free end of the arm part 30 may include a motor and a propeller, and the motor occupies most of the weight of each rotor 40. Thus, the torsional torque is generated in each arm part 30 by the weight of each rotor 40.

The torsional torque due to the weight is generated in the z-axis direction in FIG. 3. In FIG. 3, the torsional torque due to the weight of the first rotor 41 installed in the first arm part 31 becomes $r_1 \times m_1 e_z$. The torsional torque due to the weight of the second rotor 42 installed in the second arm part 32 becomes $r_2 \times m_2 e_z$. Thus, the effect of torque that cannot be controlled by the input may be eliminated when the sum of the torsional torques according to the weight of each rotor 40 constituting the plurality of arm parts 30 needs to be zero. Such a condition may be expressed by the following equation.

$$\Sigma r_i \times m_i g e_z = 0 \qquad \text{[Equation 7]}$$

In Equation 7, when two arm parts 30 are provided as in the present embodiment and the weight of each rotor 40 installed in each arm part 30 is the same, $m_1 = m_2 = m$ may be expressed, and when both sides are divided by m, it is arranged as Equation 8.

$$\Sigma r_i \times e_z = 0 \qquad \text{[Equation 8]}$$

When the sum of torques due to the weight of the plurality of arm parts 30 becomes zero, the weight of each rotor 40 does not affect the vibration control of the flexible bar structure 100, so that vibration control may be more precisely performed.

In addition, the body part 20 may include a power supply unit 60, the controller 50, a state estimation unit 510, a communication unit 80, and a sensor unit 70.

The power supply unit 60 may perform a function of supplying electricity to each rotor 40. The power supply unit 60 may be configured by wired or wireless. In the present embodiment, the battery may be included in the power supply unit 60 so that the power supply unit 60 may be configured by wireless. Thus, installation and operation of the vibration suppression device 10 is convenient.

The state estimation unit 51 may estimate the deflection value of the flexible bar structure 100 based on sensing data obtained through the sensor unit 70. The controller 50 may generate a control signal to be input to each rotor 40 that performs a function of a vibration suppression unit based on the deflection value of the flexible bar structure 100 estimated by the state estimation unit 51. In this case, the control signal may be an input signal value that controls thrust by adjusting the rotational speed of each rotor 40 by using the rotors 40.

When the vibration suppression device 10 is distributedly arranged on the plurality of flexible bar structures 100, as shown in FIG. 6, the communication unit 80 enables flexible communication between the plurality of vibration suppression devices 10, thereby performing a function that enables precise vibration suppression control of the flexible bar structure 100.

The sensor unit 70 may measure the amount of real-time vibration at a certain position of the flexible bar structure 100. Signals measured by the sensor unit 70 may be transmitted to the controller 50. The controller 50 may generate calculation and control signals for optimal vibration suppression control from signals transmitted from the sensor unit 70.

The sensor unit 70 may include sensors such as an IMU including an accelerometer, a gyro sensor, and a magnetometer, a stretch sensor capable of measuring a length change, and a load cell capable of measuring strain of a flexible body. The sensor unit 70 may be configured of each sensor or a combination of sensors.

The vibration suppression device 10 including the components described above may easily attach or detach the body part 20 to or from a certain position of the flexible bar structure 100. The body part 20 may be fixed to the flexible bar structure 100 by a snap hook and may sense the vibration of the flexible bar structure 100 in real time so as to generate thrust by rotating the rotors 40 and to apply an external force to the flexible bar structure 100 through the arm part 30, so that the vibration of the flexible bar structure 100 may be effectively reduced. In particular, in an actual system, as shown in FIG. 6, a ground manipulator 200 that is a manipulator installed on the ground, and a plurality of vibration suppression devices 10 cooperate to significantly reduce vibration of the flexible bar structure 100. Thus, the position movement or installation of the flexible bar structure 100 may be controlled similarly to a rigid body.

Figure 9:
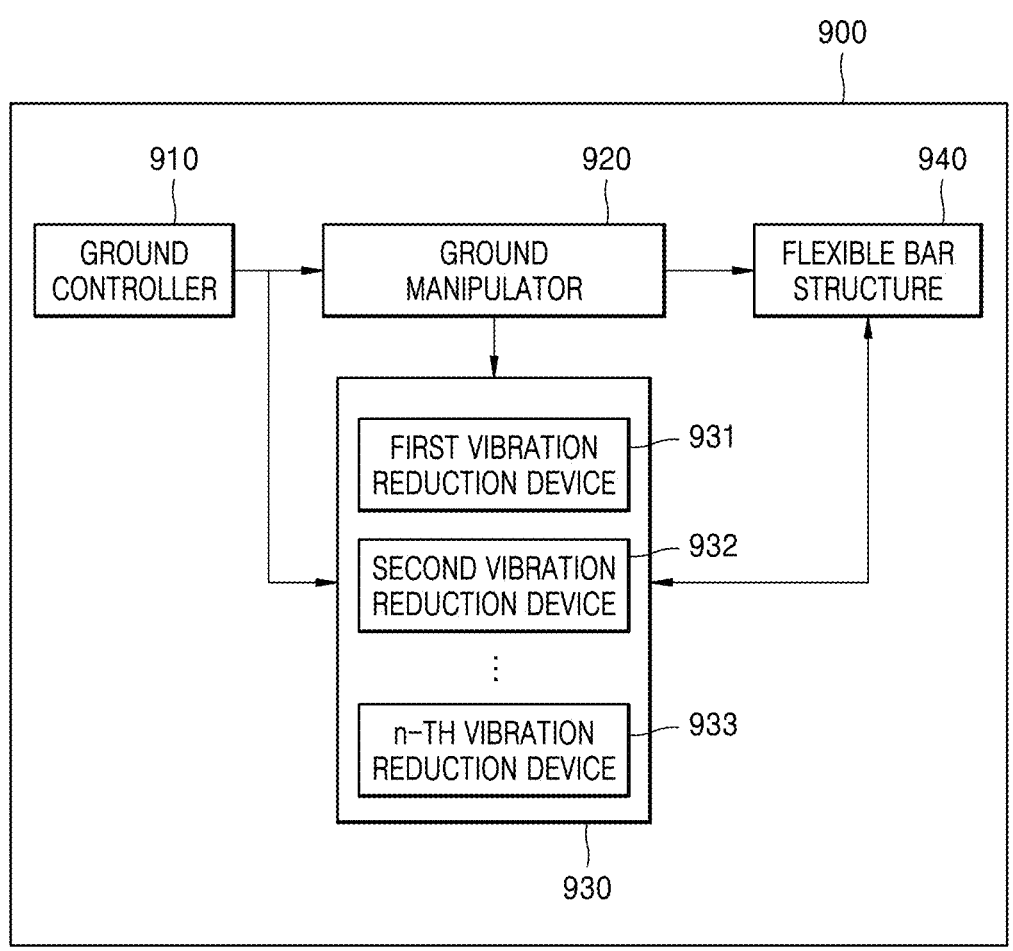
FIG. 9 is a view showing an internal configuration of the vibration suppression system, according to an embodiment.

FIG. 9 is a view showing an internal configuration of the vibration suppression system, according to an embodiment. A vibration suppression system 900 may include a ground controller 910, a ground manipulator 920, a vibration suppression device 930, and a flexible bar structure 940.

In another embodiment, the vibration suppression device 930 may include a plurality of vibration suppression devices 931, 932, and 933. The plurality of vibration suppression devices 931, 932, and 933 may be detachably attached to the flexible bar structure 940 so as to reduce vibration or disturbance of the flexible bar structure 940.

In an embodiment, the ground controller 910 may remotely control the ground manipulator 920 and the vibration suppression device 930.

The ground controller 910 may predetermine a control path of the ground manipulator 920 by assuming that the flexible bar structure 940 is a rigid body. In this case, it is assumed that the vibration suppression device 930 attached to the flexible bar structure 940 is controlled to reduce vibration and deflection occurring in the flexible body.

The ground controller 910 may also control the ground manipulator 920 in real-time. The ground controller 910 may include all terminals having a communication function and a control function, and may be implemented in the form of a computer, a laptop, a mobile phone, a hand-held terminal, and a tablet.

The ground controller 910 may control the vibration suppression device 930 independently of the ground manipulator 920. Also, when a plurality of vibration suppression devices 931, 932, and 933 are provided, the ground controller 910 may control each of the plurality of vibration suppression devices 931, 932, and 933. The ground controller 910 may transmit a control input signal to each vibration suppression device 930, so as to control the thrust of the vibration suppression device 930 so that the deflection of an end of the flexible bar structure 940 becomes zero.

Figure 10:
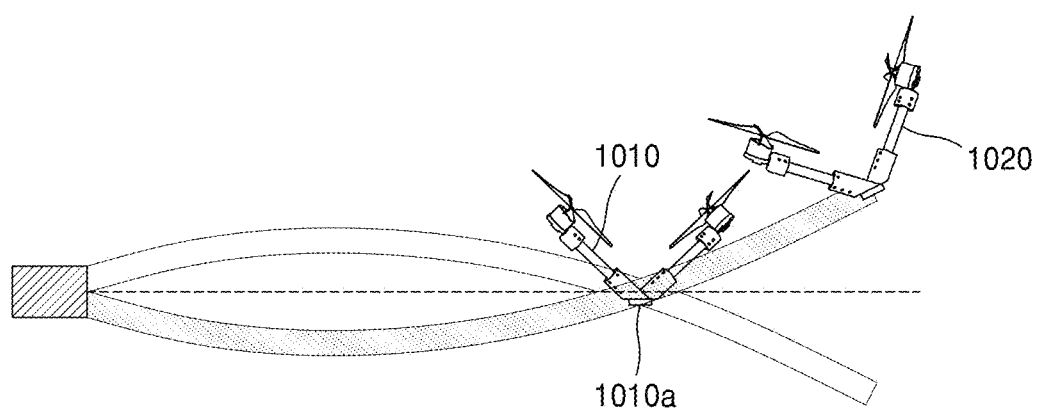
FIGS. 10 and 11 show the conditions in which vibration suppression devices are arranged on the flexible bar structure, according to an embodiment.
Figure 11:
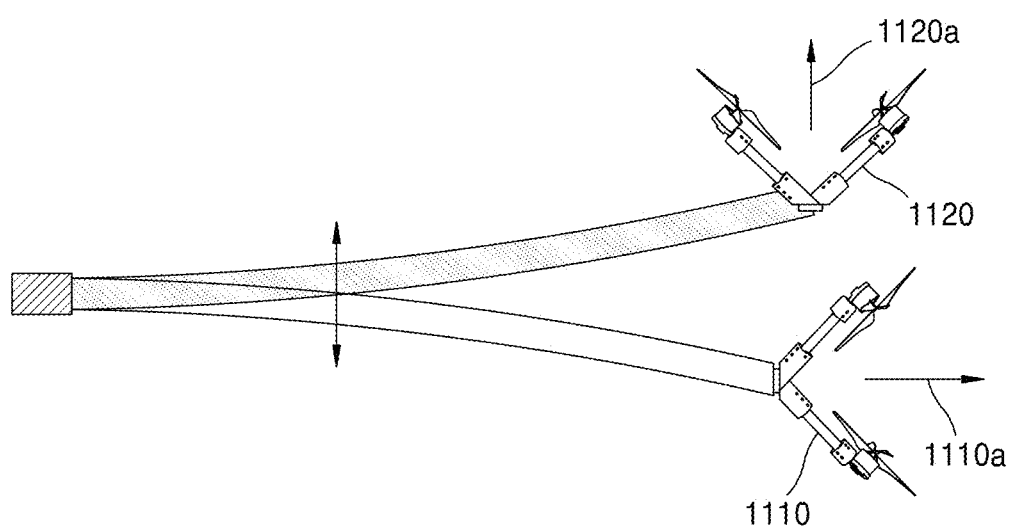

In an embodiment, FIGS. 10 and 11 show the conditions in which vibration suppression devices are arranged on the flexible bar structure, according to an embodiment.

In an embodiment, when each vibration suppression device is arranged on the flexible bar structure, a position in which each vibration suppression device is arranged on the flexible bar structure, may be determined based on the length of the flexible bar structure, cross-section and material, and the number of vibration suppression devices attached to the flexible bar structure.

The flexible bar structure may be represented by superposition of several vibration modes according to the Euler-Bernoulli equation, and each vibration mode may have a unique shape. In an embodiment, when one vibration suppression device is arranged on the flexible bar structure, it does not need to be located at a node 1010a in which a vibration shape becomes zero for each vibration mode of the flexible bar structure.

In an embodiment, when a plurality of vibration suppression devices are arranged on the flexible bar structure, at least one of the plurality of vibration suppression devices does not need to be located at the node 1010a in which a vibration shape becomes zero for each vibration mode of the flexible bar structure.

In another embodiment, when vibration occurs after an initial state of the flexible bar structure, each vibration suppression device may be arranged in a position in which a thrust value to be generated by using rotors arranged in each vibration suppression device so as to reduce vibration to a steady state in which vibration is attenuated, is minimized. The initial state of the vibration suppression device refers to a state in which no vibration or disturbance occurs.

FIG. 11 shows a direction in which the vibration suppression device generates thrust. When each of vibration suppression devices 1110 and 1120 arranged on a flexible bar structure generates thrust in a direction 1110a perpendicular to a vibration direction 1120a of a flexible body, vibration suppression efficiency is lowered. Thus, each of the vibration suppression devices 1110 and 1120 needs to generate thrust in the vibration direction 1120a of the flexible body.

In an embodiment, the vibration suppression device may be implemented such that the sum of the air resistance torque due to rotor rotation of the vibration suppression device and the torque in the torsional direction due to the thrust of the rotors may be physically perpendicular to the longitudinal direction of the flexible bar structure.

Figure 12:
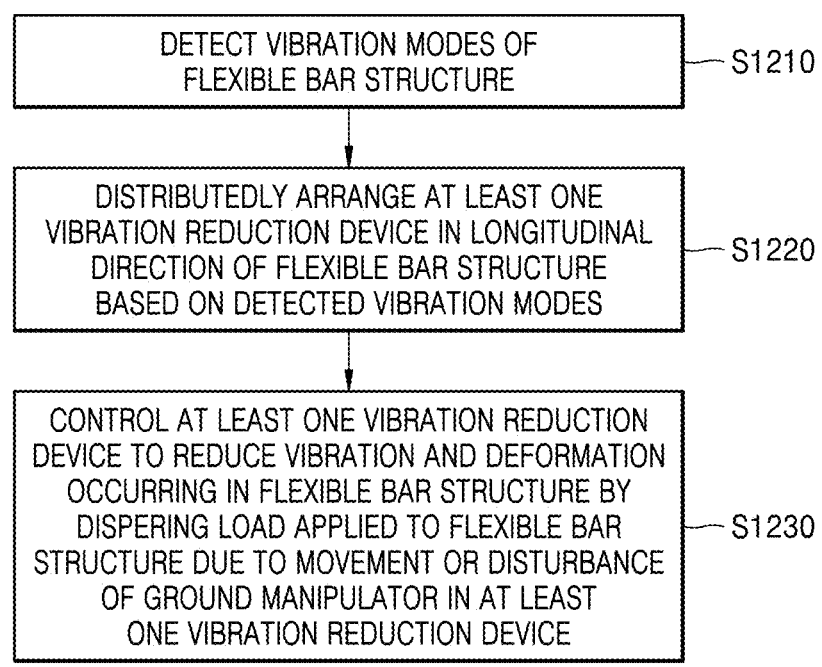
FIG. 12 is a flowchart illustrating a method of reducing vibration and disturbance on a flexible bar structure in the vibration suppression system, according to an embodiment.

FIG. 12 is a flowchart illustrating a method of reducing vibration and disturbance on a flexible bar structure in the vibration suppression system, according to an embodiment.

The ground controller (see 910 of FIG. 9) may detect vibration modes of the flexible bar structure (S1210), and at least one vibration suppression device may be distributedly arranged in the longitudinal direction of the flexible bar structure based on the detected vibration modes (S1220).

When one vibration suppression device is arranged on the flexible bar structure, one vibration suppression device may be arranged at a point other than node of vibration modes (for example, see 1010a of FIG. 10), and when a plurality of vibration suppression devices are arranged on the flexible bar structure, at least one of the plurality of vibration suppression devices may be arranged at a point other than a point in which the vibration modes of the flexible bar structure become zero.

At least one vibration suppression device arranged on the flexible bar structure may be controlled to reduce vibration and deflection occurring in the flexible bar structure by dispersing a load applied to the flexible bar structure due to movement or disturbance of the ground manipulator (S1230). In this case, each of at least one vibration suppression device is characterized by generating thrust in a vibration direction of the flexible bar structure and includes no actuators other than rotors.

The vibration suppression device according to the present disclosure is detachably combined with the flexible bar structure and is configured to prevent thrust between a plurality of rotors from interfering with each other in a process of performing a vibration suppression function of the flexible bar structure. Thus, an external force for vibration suppression may effectively act on the flexible bar structure.

In addition, as in an embodiment, when the sum of the air resistance torque due to rotation of the rotors installed in each arm part and the torque in the torsional direction due to the thrust of the rotors is configured to be physically perpendicular to the longitudinal direction of the flexible bar structure, an external force does not act in the longitudinal direction of the flexible bar structure so that the flexible bar structure may be controlled like a rigid body without torsional deflection.

Furthermore, as in an embodiment, when the sum of the torsional torques generated due to the weight of the rotors installed at a free end of the arm part is configured to become zero, lowering of vibration control efficiency due to the weight of the rotors may be prevented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vibration suppression system comprising:
   a ground manipulator;
   a flexible bar structure connected to an end-effector of the ground manipulator; and
   at least one vibration suppression device configured to be distributedly arranged to be attached/detached to/from the flexible bar structure and configured to be controlled to reduce vibration and deflection occurring in the flexible bar structure by dispersing a load applied to the flexible bar structure due to movement or disturbance of the ground manipulator, wherein
   the at least one vibration suppression device includes no actuators other than rotors; and wherein each of the at least one vibration suppression device comprises:
   a state estimation unit configured to estimate deflection of the flexible bar structure based on sensing data obtained through a sensor unit;
   a vibration suppression unit configured to reduce vibration and deflection of the flexible bar structure by using rotors; and
   a controller configured to generate a control signal to be input to the vibration suppression unit based on a deflection value of the flexible bar structure estimated by the state estimation unit, wherein the control signal comprises data about a thrust value to be generated by using the rotors.

2. The vibration suppression system of claim 1, wherein each of the at least one vibration suppression device is controlled to reduce vibration and deflection occurring in the flexible bar structure based on thrust generated by using the rotors.

3. The vibration suppression system of claim 1, wherein vibration of the flexible bar structure satisfies the Euler-Bernoulli equation, and the flexible bar structure is expressed in finite vibration modes based on the Euler-Bernoulli equation, and
   a deflection degree of the flexible bar structure of the deflection value of the flexible bar structure estimated by the state estimation unit
   is calculated by superposition of vibration modes of the flexible bar structure, and
   a deflection angle of the flexible bar structure is calculated by a value obtained by differentiating the deflection of the flexible bar structure in a longitudinal direction of a flexible bar.

4. The vibration suppression system of claim 1, wherein, in a case where a plurality of vibration suppression devices are attached to/detached from the flexible bar structure to be distributed in different positions of the flexible bar structure, at least one of the plurality of vibration suppression devices is arranged to be attached to/detached from a position other than node of the vibration modes of the flexible bar structure.

5. The vibration suppression system of claim 1, wherein each of the at least one vibration suppression device generates thrust in a vibration direction of the flexible bar structure.

6. The vibration suppression system of claim 1, wherein the sum of a rotor drag induced torque due to rotation of the rotors and a torque in a torsional direction due to thrust of the rotors is physically perpendicular to the longitudinal direction of the flexible bar structure.

7. The vibration suppression system of claim 1, wherein the vibration modes of the flexible bar structure have different natural frequencies.

8. The vibration suppression system of claim 1, wherein each of the at least one vibration suppression device comprises:
   a body part detachably combined with the flexible bar structure;
   a plurality of arm parts being upwardly inclined and extending from the body part in different directions; and
   rotors installed at a free end of each of the plurality of arm parts and having the form of a propeller installed to be rotatable with respect to the arm parts, wherein
   cylindrical trajectories that extend rotation trajectories of the rotors in a direction of a rotational axis of each of the rotors are arranged so as not to interfere with each other.

9. The vibration suppression system of claim 1, wherein the ground manipulator is fixed to the ground or is mountable on a mobile platform and controls a manipulation direction of the flexible bar structure.

10. The vibration suppression system of claim 1, wherein, in a case where the at least one vibration suppression devices is arranged on the flexible bar structure,
    a position of each of the at least one vibration suppression devices arranged on the flexible bar structure is determined according to a length of the flexible bar structure, a cross-section and material, and the number of the at least one vibration suppression device attached to the flexible bar structure.

11. The vibration suppression system of claim 10, wherein each of the at least one vibration suppression device
    is arranged in a position in which a thrust value to be generated by using the rotors arranged in each of the vibration suppression devices so as to reduce vibration to a steady state in which vibration is attenuated, is minimized in a case where vibration occurs after an initial state of the flexible bar structure.

12. A method of reducing vibration of a flexible bar structure in a vibration suppression system,
    wherein the vibration suppression system comprises a flexible bar structure connected to an end-effector of a ground manipulator and at least one vibration suppression device, the method comprising:
    detecting vibration modes of the flexible bar structure;
    distributedly arranging the at least one vibration suppression device in a longitudinal direction of the flexible bar structure based on the detected vibration modes; and
    controlling the at least one vibration suppression device to reduce vibration and deflection occurring in the flexible bar structure by dispersing a load applied to the flexible bar structure due to movement or disturbance of the ground manipulator in the at least one vibration suppression device, wherein
    the at least one vibration suppression device includes no actuators other than rotors; and wherein each of the at least one vibration suppression device comprises:
    a sensor unit, rotors, and a processor, and
    a state estimation unit estimates deflection of the flexible bar structure based on sensing data obtained through the sensor unit, and
    a vibration suppression unit reduces vibration and deflection of the flexible bar structure by using the rotors, and
    the processor generates a control signal to be input to the vibration suppression unit based on a deflection value of the flexible bar structure estimated by the state estimation unit, and the control signal comprises data about a thrust value to be generated by using the rotors.

13. The method of claim 12, wherein the distributedly arranging comprises, in a case where one vibration suppression device is arranged on the flexible bar structure, arranging one vibration suppression device at a point other than the vibration modes of the flexible bar structure; and in a case where a plurality of vibration suppression devices are arranged on the flexible bar structure, arranging the at least one of the plurality of vibration suppression devices at a point other than node of the vibration modes of the flexible bar structure.

14. The method of claim 12, wherein each of the at least one vibration suppression device generates thrust in a vibration direction of the flexible bar structure.

15. The method of claim 12, wherein the distributedly arranging comprises determining a position of each of the vibration suppression devices arranged on the flexible bar structure according to a length of the flexible bar structure, a cross-section and material, and the number of the vibration suppression devices attached to the flexible bar structure.

16. The method of claim 15, wherein, in a case where each of the vibration suppression devices serves as an actuator, each of the vibration suppression devices is arranged in a position in which a thrust value to be generated by using the rotors is minimized.

* * * * *